United States Patent
Jung et al.

(10) Patent No.: US 9,300,366 B2
(45) Date of Patent: Mar. 29, 2016

(54) WIRELESS POWER TRANSMITTER

(71) Applicant: LG INNOTEK CO., LTD., Seoul (KR)

(72) Inventors: Woo Kil Jung, Seoul (KR); Jung Oh Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 694 days.

(21) Appl. No.: 13/650,802

(22) Filed: Oct. 12, 2012

(65) Prior Publication Data

US 2013/0093255 A1    Apr. 18, 2013

(30) Foreign Application Priority Data

Oct. 14, 2011    (KR) .................. 10-2011-0105516

(51) Int. Cl.
| | |
|---|---|
| *H01F 27/42* | (2006.01) |
| *H01F 37/00* | (2006.01) |
| *H01F 38/00* | (2006.01) |
| *H04B 5/00* | (2006.01) |
| *H02J 17/00* | (2006.01) |
| *H02J 5/00* | (2006.01) |
| *H02J 7/02* | (2006.01) |
| *H02J 7/00* | (2006.01) |
| *H01F 38/14* | (2006.01) |

(52) U.S. Cl.
CPC .............. *H04B 5/0037* (2013.01); *H02J 5/005* (2013.01); *H02J 7/025* (2013.01); *H02J 17/00* (2013.01); *H04B 5/0075* (2013.01); *H01F 38/14* (2013.01); *H02J 7/00* (2013.01)

(58) Field of Classification Search
CPC ............. H02J 17/00; H02J 7/00; H02J 7/025; H02J 5/005; H01F 27/28; H01F 41/06; B60L 11/182

USPC .............. 307/104, 9.1, 10.1, 82, 66, 64, 80; 320/108, 107, 109, 106; 604/20, 19, 604/22; 336/220, 222

See application file for complete search history.

(56) References Cited

U.S. PATENT DOCUMENTS

| | | | |
|---|---|---|---|
| 6,498,553 B1 | 12/2002 | Tanaka et al. | |
| 7,262,680 B2 | 8/2007 | Wang | |
| 7,893,564 B2 | 2/2011 | Bennett | |
| 8,049,588 B2 | 11/2011 | Shibuya et al. | |

(Continued)

FOREIGN PATENT DOCUMENTS

| | | |
|---|---|---|
| CN | 2017-49754 U | 2/2011 |
| GB | 2399228 A | 9/2004 |

(Continued)

OTHER PUBLICATIONS

Office Action dated Dec. 17, 2012 in Korean Application No. 10-2011-0105516, filed Oct. 14, 2011.

(Continued)

*Primary Examiner* — Rexford Barnie
*Assistant Examiner* — Jagdeep Dhillon
(74) *Attorney, Agent, or Firm* — Saliwanchik, Lloyd & Eisenschenk

(57) ABSTRACT

A wireless power transmitter according to an embodiment includes a coil and a capacitor which resonate with a wireless power receiver. The coil includes a plurality of cell groups and a core which connects the cell groups with each other. Each of the cell groups includes a plurality of cells. Each of the cells is configured such that magnetic field generated by currents flowing through the cells are formed in a same direction. Each of the cell groups is adjacent to at least one cell group. Each of the cell groups and the core are configured as one conductive wire.

13 Claims, 4 Drawing Sheets

(56) References Cited

U.S. PATENT DOCUMENTS

| | | | |
|---|---|---|---|
| 8,159,183 B2 | 4/2012 | Choi et al. | |
| 2009/0096413 A1 | 4/2009 | Partovi et al. | |
| 2009/0284218 A1* | 11/2009 | Mohammadian | G06K 7/0008 320/107 |
| 2010/0219183 A1 | 9/2010 | Azancot et al. | |
| 2010/0259217 A1 | 10/2010 | Baarman et al. | |
| 2010/0298759 A1* | 11/2010 | Gehl | A61N 1/327 604/20 |
| 2010/0308939 A1 | 12/2010 | Kurs | |
| 2011/0086256 A1 | 4/2011 | Julstrom et al. | |
| 2011/0095618 A1* | 4/2011 | Schatz | H03H 7/40 307/104 |
| 2011/0101788 A1 | 5/2011 | Sun et al. | |
| 2011/0181118 A1 | 7/2011 | Chen et al. | |
| 2011/0248570 A1 | 10/2011 | Hong et al. | |
| 2011/0279214 A1* | 11/2011 | Lee | H01F 17/08 336/220 |
| 2013/0038135 A1 | 2/2013 | Ichikawa | |

FOREIGN PATENT DOCUMENTS

| | | |
|---|---|---|
| JP | 8-196004 | 7/1996 |
| JP | 2001-060519 | 3/2001 |
| JP | 2009-525715 A | 7/2009 |
| JP | 2011-135754 | 7/2011 |
| JP | 2012-502602 | 1/2012 |
| TW | 2009-43664 A | 10/2009 |
| WO | WO-2008/016273 A1 | 2/2008 |
| WO | WO 2008/118178 | 10/2008 |
| WO | WO-2008/137996 A1 | 11/2008 |
| WO | WO 2009/066433 | 5/2009 |
| WO | WO-2010/118191 A1 | 10/2010 |

OTHER PUBLICATIONS

European Search Report dated Mar. 23, 2015 in European Application No. 12188069.4.

Office Action dated Apr. 22, 2014 in Taiwanese Application No. 101137262.

Sample, et al. "Analysis, Experimental Results, and Range Adaptation of Magnetically Coupled Resonators for Wireless Power Transfer," Industrial Electronics, IEEE Transactions, vol. 58:2. Feb. 2011, p. 544-55.

Office Action dated Dec. 10, 2013 in Japanese Application No. 2012-224755.

* cited by examiner

WIRELESS POWER TRANSMITTER

CROSS-REFERENCE TO RELATED APPLICATION

This application claims the benefit under 35 U.S.C. §119 of Korean Patent Application No. 10-2011-0105516, filed Oct. 14, 2011, which is hereby incorporated by reference in its entirety.

BACKGROUND

The embodiment relates to a wireless power transmitter. In more particular, the embodiment relates to a wireless power transmitter capable of improving power transmission efficiency between the wireless power transmitter and a wireless power receiver and reducing the amount of magnetic field that leaks to the outside.

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. Until now, the long-distance transmission using the magnetic induction, the resonance and the short-wavelength radio frequency has been used as the wireless energy transfer scheme.

Recently, among wireless power transmitting technologies, an energy transmitting scheme using resonance has been widely used.

Since an electric signal generated between the wireless power transmitter and the wireless power receiver is wirelessly transferred through coils in a wireless power transmitting scheme using resonance, a user may easily charge electronic appliances such as a portable device.

However, in the wireless power transmitting scheme using resonance, a magnetic field generated from a transmission side may be leaked to the outside. The leaked magnetic field may exert a bad influence upon human health.

BRIEF SUMMARY

An embodiment provides a wireless power transmitter to minimize a leakage of magnetic field generated between a wireless power transmitter and a wireless power receiver while power is being transmitted using resonance and maximize power transmission efficiency.

A wireless power transmitter according to an embodiment includes a coil and a capacitor which resonate with a wireless power receiver. The coil includes a plurality of cell groups and a core which connects the cell groups with each other. Each of the cell groups includes a plurality of cells. Each of the cells is configured such that magnetic field generated by currents flowing through the cells are formed in a same direction. Each of the cell groups is adjacent to at least one cell group. Each of the cell groups and the core are configured as one conductive wire.

According to the embodiments, following effects can be achieved.

First, the leakage of magnetic field to the outside may be minimized by improving a structure of a coil in the wireless power transmitter.

Second, the power transmission efficiency between the wireless power transmitter and the wireless power receiver may be maximized.

DETAILED DESCRIPTION

Figure 1:
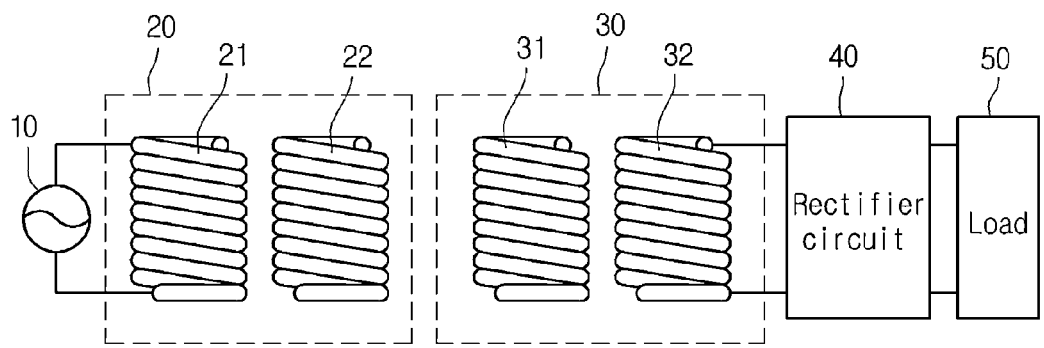
FIG. 1 is a view illustrating a wireless power transmission system according to an embodiment.

Terms and words used in the specification and the claims shall not be interpreted as commonly-used dictionary meanings, but shall be interpreted as to be relevant to the technical scope of the invention based on the fact that the inventor may property define the concept of the terms to explain the invention in best ways.

Therefore, the embodiments and the configurations depicted in the drawings are illustrative purposes only and do not represent all technical scopes of the embodiments, so it should be understood that various equivalents and modifications may exist at the time of filing this application.

FIG. 1 illustrates a wireless power transmission system according to an embodiment.

The power generated from the power source 10 is provided to the transmitting unit 20, such that the power is transferred by resonance to the receiving unit 30 which is resonant with the transmitting unit 20, that is, which has the same resonant frequency value as that of the transmitting unit 20. The power transferred to the receiving unit 30 is transferred via a rectifier circuit 40 to the load side 50. The load side 50 may be a battery or a predetermined apparatus which needs power.

In detail, the power source 10 is an AC power source for supplying AC power of a predetermined frequency.

The transmitting unit 20 includes a transmission coil 21 and a transmission resonant coil 22. The transmission coil 21 is connected to the power source 10, such that an AC current flows through the transmission coil 21. When an AC current flows through the transmission coil 21, an AC current is induced to the transmission resonant coil 22 physically spaced apart from the transmission coil 21 due to electromagnetic induction. The power transferred to the transmission resonant coil 22 is transmitted by resonance to the receiving unit 30 which forms a resonance circuit with the transmitting unit 20.

Power may be transferred using resonance between two LC circuits which are impedance-matched with each other. The power transfer using resonance is able to transfer power at higher efficiency to a longer distance than those by electromagnetic induction.

The receiving unit 30 includes a reception resonant coil 31 and a reception coil 32. The power transmitted through the transmission resonant coil 22 is received at the reception resonant coil 31, so that alternate current flows through the reception resonant coil 31. The power transferred to the reception resonant coil 31 is transferred to the reception coil 32 by electromagnetic induction. The power transferred to the reception coil 32 is rectified through the rectifier circuit 40 and transferred to the load 50.

Figure 2:
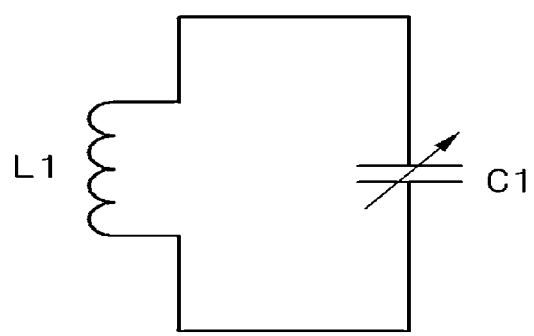
FIG. 2 is a circuit diagram showing an equivalent circuit of a transmitting coil according to an embodiment.

FIG. 2 is an equivalent circuit diagram of the transmission coil 21 according to the embodiment. As shown in FIG. 2, the transmission coil 21 may include an inductor L1 and a capacitor C1, and form a circuit having a suitable inductance value and a suitable capacitance value. The capacitor C1 may be a variable capacitor. The transmitting unit 20 may control the variable capacitor, such that the transmitting unit 20 may perform an impedance matching. Meanwhile, equivalent circuits of the transmission resonant coil 22, the reception resonance coil 31, and the reception coil 32 may be equal to that depicted in FIG. 2.

Figure 3:
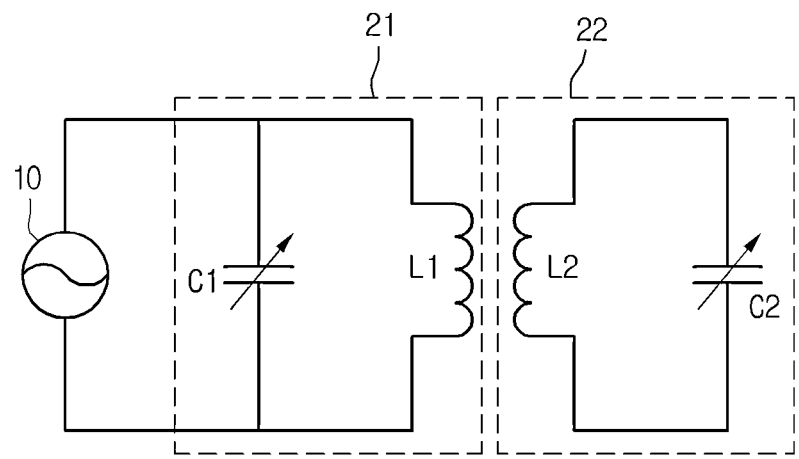
FIG. 3 is a circuit diagram showing an equivalent circuit of a power source and transmitting unit according to an embodiment.

FIG. 3 is an equivalent circuit diagram of the power source 10 and the transmitting unit 20 according to the embodiment. As shown in FIG. 3, each of the transmission coil 21 and the transmission resonant coil 22 may include an inductor L1 or L2 and a capacitor C1 or C2.

Figure 4:
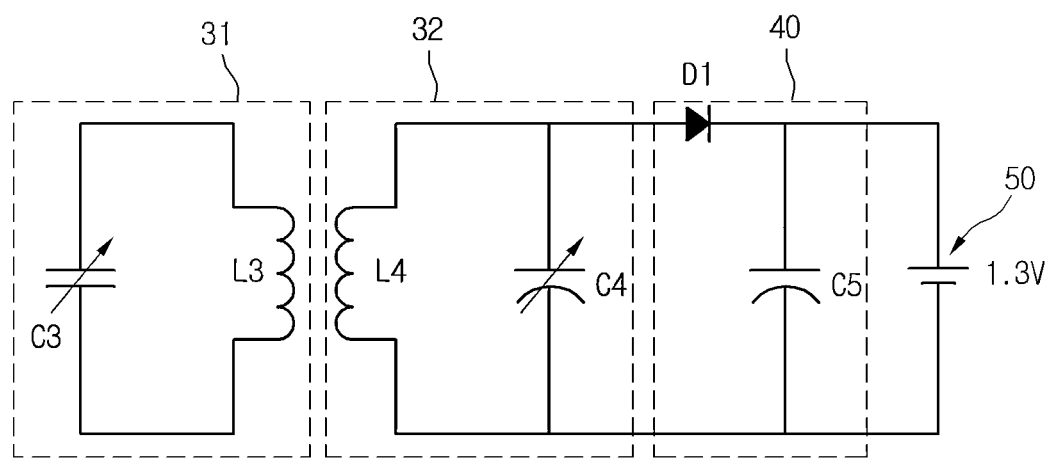
FIG. 4 is a circuit diagram showing an equivalent circuit of a receiving resonant coil, a receiving coil, a rectifier circuit and a load according to an embodiment.

FIG. 4 is an equivalent circuit diagram of the reception resonance coil unit 31, the reception coil unit 32, a rectifier circuit 40 and the load 50 according to the embodiment.

As shown in FIG. 4, each of the transmission resonant coil unit 31 and the reception coil part 32 may include an inductor L3 or L4 and a capacitor C3 or C4 having a predetermined inductance value and a predetermined capacitance value. The rectifier circuit 40 may include a diode D1 and a rectifying capacitor C5 such that the rectifier circuit 40 converts AC power into DC power and outputs the DC power. Although the load 50 is denoted as 1.3 V DC power, the load 50 may be a battery or other devices requiring DC power.

Figure 5:
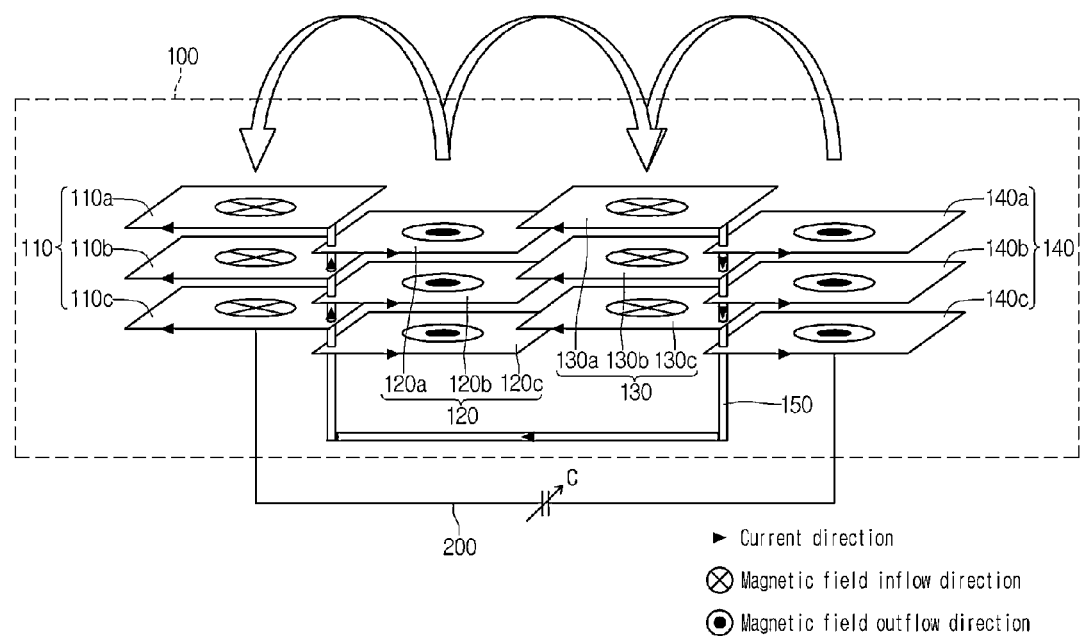
FIG. 5 is a view illustrating an example of a structure of a wireless power transmitter according to an embodiment.

FIG. 5 is a view illustrating an example of a structure of a wireless power transmitter according to an embodiment.

The wireless power transmitter includes a coil 100 and a capacitor 200.

In the embodiment, when power is transmitted to the wireless power receiver 30 using resonance, the coil 100 may be the transmission resonant coil 22 described in FIG. 1.

In the embodiment, when power is transmitted to the wireless power receiver 30 using electromagnetic induction, the coil 100 may be the transmission inducing coil 21 described in FIG. 1.

The coil 100 may be resonantly combined with the reception resonant coil 31 of the wireless power receiver 30 to transmit power using resonance.

The capacitor 200 may be a variable capacitor so that the capacitor 200 may be operated with the wireless power receiver 30 at a resonance frequency.

The coil 100 includes a plurality of cell groups of a first cell group 110, a second cell group 120, a third cell group 130, and a fourth cell group 140 and a core 150. Although the coil 100 including four cell groups is depicted in FIG. 5, the coil 100 is not limited thereto and may include four cell groups or more.

All of the first to fourth cell groups 110 to 140 and the core 150 may be configured as one conductive wire.

Preferably, the conductive wire may be made of copper.

A plane formed by the cells of each cell group may have one of a rectangular shape and a triangular shape, but the shape of the plane is not limited thereto and the plane may have various shapes.

The second cell group 120 is adjacent to the first cell group 110, the third cell group 130 is adjacent to the second cell group 120, and the fourth cell group 140 is adjacent to the third cell group 130.

The first cell group 110 includes a first cell 110a, a second cell 110b, and a third cell 110c.

The distance between the first and second cells 110a and 110b may be equal to the distance between the second and third cells 110b and 110c.

The planes formed by the first to third cells 110a to 110c may be parallel to each other.

The second cell group 120 includes a first cell 120a, a second cell 120b, and a third cell 130c.

The distance between the first and second cells 120a and 120b may be equal to the distance between the second and third cells 120b and 120c.

The planes formed by the first to third cells 120a to 120c may be parallel to each other.

The first to third cells 110a to 110c of the first cell group 110 may be vertically connected each other through the core 150. The first to third cells 120a to 120c of the second cell group 120 may be vertically connected each other through the core 150.

That is, the core 150 may connect the cells included in each cell group with each other. According to the embodiment, the core 150 may be made of copper.

The third cell group 130 includes a first cell 130a, a second cell 130b, and a third cell 130c.

The distance between the first and second cells 130a and 130b may be equal to that between the second and third cells 130b and 130c.

The planes formed by the first to third cells 130a to 130c may be parallel to each other.

The fourth cell group 140 includes a first cell 140a, a second cell 140b, and a third cell 140c.

The distance between the first and second cells 140a and 140b may be equal to the distance between the second and third cells 140b and 140c.

The planes formed by the first to third cells 140a to 140c may be parallel to each other.

The first to third cells 130a to 130c of the third cell group 130 may be vertically connected each other through the core 150. The first to third cells 140a to 140c of the fourth cell group 140 may be vertically connected each other through the core 150.

Further, the first and second cell groups 110 and 120 are connected to the third and fourth cell groups 130 and 140 by the core 150.

As denoted on the first cell 130a of the third cell group 130 in FIG. 5, a current, which is supplied from the power source connected to an external device, flows around the first cell 130a in an arrow direction, that is in the clockwise direction, and then, flows around the core 150 into the first cell 140a of the fourth cell group 140. Then, the current flows around the first 140a in the counterclockwise direction and flows around the core 150 into the second cell 130b.

After this procedure is repeated, the current, which flows out from the third cell 140c, may flow into the third cell 120c of the second cell group 120. This current flowing procedure is repeated. That is, the current flowing into the third cell 140c of the second cell group 120 flows counterclockwise one time along the third cell 140c and then flows into the third cell 110c of the first cell group 110 by passing through the core 150. The current flowing into the third cell 140c of the second cell group 120 may flow clockwise one time along the third cell 110c, and then flows into the second cell 120b of the second cell group 120 by passing through the core 150. The next procedures are identical to the above.

As the current flows through each cell, a magnetic field is generated in the inflow direction to the center of each cell 130a to 130c of the third cell group 130 and in the outflow direction from the center of each cell 140*a* to 140*c* of the fourth cell group 140. The reason is that the direction, in which the magnetic field is formed by the current flow, is defined according to the right-hand screw rule of Ampere.

If the magnetic field is formed as described above, the magnetic field, which are formed by the current flowing through the third cell group 130 and the current flowing through the fourth cell group 140, may be concentrically formed at the center of the third cell group 130, and the formation directions of the magnetic field may be changed by each cell group.

The principle of changing the formation direction of the magnetic field is as follows.

A part of the magnetic field formed in an upward direction from the center of the second cell group 120 is influenced by the magnetic field entering into the center of the first cell group 110 adjacent to the second cell group 120, so that the part of the magnetic field enters into the center of the first cell group 110. This is a principle of changing the advance direction of the magnetic field by using the reverse polarity.

Likewise, a part of the magnetic field formed in an upward direction at the center of the second cell group 120 is influenced by the magnetic field entering into the center of the third cell group 130 adjacent to the second cell group 120, so that the part of the magnetic field enters into the center of the third cell group 130.

The first and third cell groups 110 and 130 adjacent to the second cell group 120 change a part of the magnetic field formed by the second cell group 120, so that an amount of magnetic field that leaks to the outside may be minimized, and at the same time, the magnetic field formed by each cell group may be concentrated in a specific direction.

Although only magnetic flux lines formed at an upper portion of the coil 100 are depicted in FIG. 5, the magnetic flux lines formed at a lower portion of the coil 100 may be depicted in the same manner as that of FIG. 5.

As a result, the structure of the coil 100 of the wireless power transmitter may change the magnetic field formed in the upward direction or the downward direction, so that the amount of magnetic field that leaks to the outside may be minimized. If the amount of magnetic field that leaks to the outside is minimized, a bad effect exerted on human health may be inhibited.

Simultaneously, the structure of the coil 100 may concentrically form the magnetic field, so that power transmission efficiency may be maximized.

Figure 6:
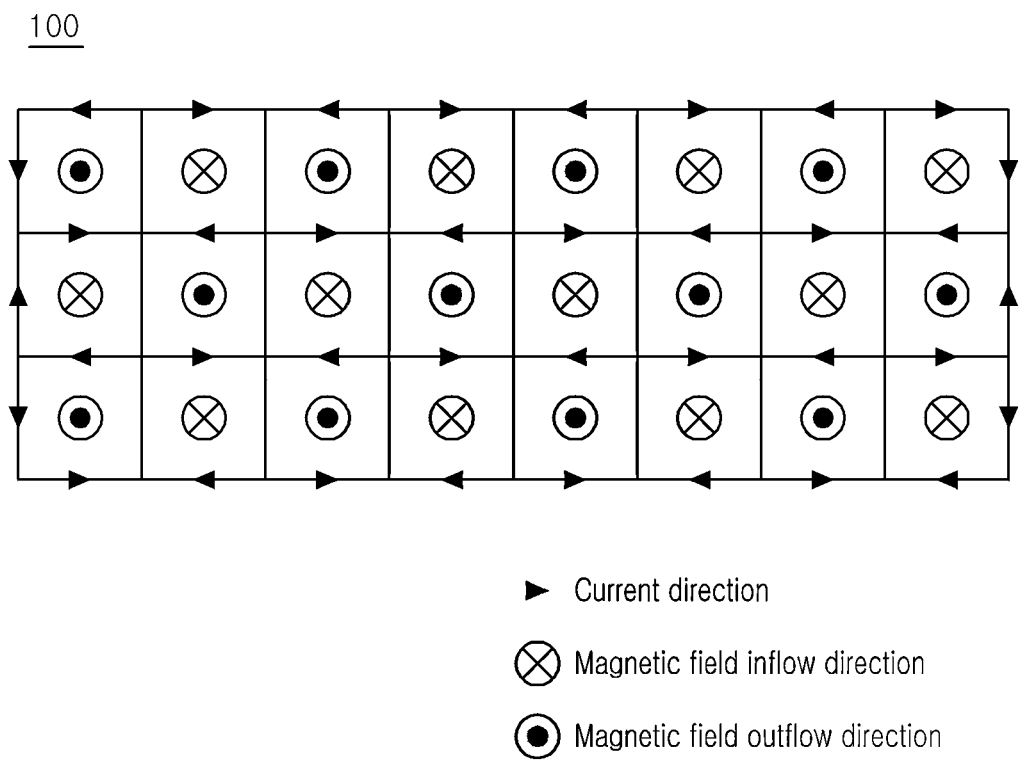
FIG. 6 is a plane view illustrating an example of a structure of a wireless power transmitter according to an embodiment.

FIG. 6 is a plane view illustrating one example of a configuration of the wireless power transmitter according to the embodiment.

When the wireless power transmitter is viewed from the top, the coil 100 may be illustrated as shown in FIG. 6.

The coil 100 includes a plurality of cell groups. Each cell group may include a plurality of cells and planes formed by the cells of each cell group may be parallel with each other.

Each cell group may be adjacent to at least one cell group.

When a current flow through each cell in the directions of arrows depicted in FIG. 6, the magnetic field are formed at each cell in the inflow and outflow directions into and from each cell according to the right-hand screw rule of Ampere.

Each cell group may form the magnetic field concentrated by the cells in the inflow or outflow directions, and may change the outflow direction of the magnetic field using the different polarity between the upper side and the lower side of the coil 100.

As described above, the structure of the coil 100 of the wireless power transmitter may minimize the magnetic field that leaks in an upward direction or a downward direction by changing the inflow or outflow direction of the magnetic field, so that the coil 100 may assist to inhibit the hazard to health, and at the same time, may maximize power transmission efficiency by concentrically forming the magnetic field.

What is claimed is:

1. A wireless power transmitter comprising:
a coil and a capacitor which resonate with a wireless power receiver,
wherein the coil includes a plurality of cell groups and a core which connects the cell groups with each other,
wherein each of the cell groups includes a plurality of cells,
wherein each of the cells is configured such that a magnetic field generated by currents flowing through the cells of a cell group is formed in a same direction,
wherein each of the cell groups is adjacent to at least one cell group,
wherein each of the cell groups and the core are configured as one conductive wire,
wherein a direction of a magnetic field formed by a first cell group of the cell groups is different from a direction of a magnetic field formed by a second cell group of the cell groups, and wherein the first and second cell groups are adjacent to each other and connected to each other through the core.

2. The wireless power transmitter of claim 1, wherein the magnetic field formed by the first cell group is directed to an inside of the first cell group, and the magnetic field formed by the second cell group is directed to an outside of the second cell group.

3. The wireless power transmitter of claim 1, wherein the magnetic field generated from the first cell group changes the direction of the magnetic field generated from the second cell group.

4. The wireless power transmitter of claim 1, wherein the cells of the first cell group and the cells of the second group are alternately wound in a clockwise direction and a counterclockwise direction.

5. The wireless power transmitter of claim 4, wherein the cells of the first cell group and the cells of the second group are alternately wound and stacked in the clockwise direction and the counterclockwise direction.

6. The wireless power transmitter of claim 1, wherein the directions of the magnetic field are based on the right-hand screw rule of Ampere.

7. The wireless power transmitter of claim 1, wherein distances between the cells of each cell group are equal to each other.

8. The wireless power transmitter of claim 1, wherein the cells of each cell group and the cells of an adjacent cell group are vertically connected with each other through the core.

9. The wireless power transmitter of claim 1, wherein planes formed by the cells of each cell group are parallel with each other.

10. The wireless power transmitter of claim 8, wherein planes formed by the cells of each cell group have one of a rectangular shape and a triangular shape.

11. The wireless power transmitter of claim 1, wherein the cell groups are formed on a printed circuit board.

12. The wireless power transmitter of claim 1, wherein the cells are formed by the conductive wire wound at least one time.

13. The wireless power transmitter of claim 1, wherein the conductive wire includes copper.

* * * * *